US006748237B1

(12) United States Patent
Bates et al.

(10) Patent No.: US 6,748,237 B1
(45) Date of Patent: Jun. 8, 2004

(54) AUTOMATED SELECTION OF AUDIO BROADCAST SIGNAL SOURCE BASED ON USER PREFERENCE CRITERION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 09/586,834

(22) Filed: Jun. 5, 2000

(51) Int. Cl.[7] .................................................. H04B 1/18

(52) U.S. Cl. ................................ 455/553.1; 455/161.1; 455/161.2; 455/186.1; 455/186.2

(58) Field of Search ........................... 455/186.1, 553.1, 455/161.2, 161.1, 186.2

(56) References Cited

U.S. PATENT DOCUMENTS 5,898,910 A * 4/1999 Miyake et al. ........... 455/186.1
6,021,320 A * 2/2000 Bickford et al. ......... 455/186.1
6,112,064 A * 8/2000 Arrowsmith et al. ..... 455/186.1
6,141,536 A * 10/2000 Cvetkovic et al. ............ 455/45
6,611,678 B1 * 8/2003 Zweig et al. ............ 455/161.3

* cited by examiner

*Primary Examiner*—Nick Corsano
*Assistant Examiner*—Alan T. Gantt
(74) *Attorney, Agent, or Firm*—Wood, Herron & Evans

(57) ABSTRACT

An apparatus, program product, and method automate the selection of audio broadcast signals based upon a user preference criterion, typically by receiving a first audio broadcast signal from a first source, and concurrently monitoring a second source to locate a second audio broadcast signal matching a user preference criterion. The user preference criterion may represent a particular type of song, program, artist, genre, etc., or in the alternative may represent one or more specific programs, songs, etc. By monitoring for sources that match the user preference criterion concurrently with receiving a signal from a first source, automation of the selection of matching audio broadcast signals (e.g., by notifying a user of a match, automatically selecting a matching audio broadcast signal, etc.) is greatly facilitated.

29 Claims, 5 Drawing Sheets

AUTOMATED SELECTION OF AUDIO BROADCAST SIGNAL SOURCE BASED ON USER PREFERENCE CRITERION

FIELD OF THE INVENTION

The invention is generally related to the transmission and reception of audio broadcasts, e.g., from radio stations and the like.

BACKGROUND OF THE INVENTION

Radio has been an important part of our culture for many years. Despite competition from relatively newer broadcast media such as television and the Internet, many people still find radio to be an important source of news, information, and entertainment. Radio has also significantly advanced since the days of analog AM and FM broadcasts. For example, radio broadcasts are now capable of being broadcast in a digital format, typically using a packet-based communication medium, and often providing better sound quality than with older analog technologies. Digital radio broadcasts are also capable of transmitting additional information to listeners, e.g., station call letters, program information, etc.

One continually strong market for radio stations has been listeners in automobiles, particularly due to the fact that visual information available from television and the Internet is not compatible with keeping one's eyes on the road. Mobile radio receivers commonly known as car radios or car stereos have long been provided as standard equipment in automobiles and other vehicles.

Mobile radio receivers have always suffered from the problem of varying signal strengths of audio broadcast signals such as radio broadcasts. Radio stations are capable of transmitting over only a certain geographical area, so the farther a receiver gets from a radio transmitter, the weaker the signal, and the poorer the reception by the receiver. Topographical factors such as buildings, tunnels, mountains, etc. can also affect signal strength. Thus, as a listener of a particular radio station rides along in an automobile, it is not uncommon for the reception of the audio broadcast signal to continually increase and decrease in quality.

Reception problems are often more problematic for travelers, as such listeners are constantly driving into and out of the reception areas for a wide variety of radio stations, the programming content of many if not all of which is unknown to such listeners. Consequently, as such listeners encounter poor reception of a radio station of interest, they are often required to manually scan through a radio band to attempt to locate other interesting radio broadcasts.

As one example, a listener may prefer a certain type of music, e.g., rock or country music. If a rock listener loses reception of a rock station, he or she will typically be forced to scan through other stations looking for other rock stations that are more likely to play songs that are interesting to the listener.

As another example, rather than being interested in a certain genre, a listener may be listening to a specific program such as a sporting event. Invariably, reception will become poor at a critical time in the event, e.g., in the last inning of a tight baseball game. Locating another station for the sporting event in such an instance is even more problematic than simply finding another station playing a general type of music, as the likelihood of finding the sporting event is lower, and time constraints necessitate the use of haste in locating the event as quickly as possible.

In addition to the inconvenience and frustration associated with manually searching through a radio band, any manual interaction with a radio receiver presents some safety concerns, as a listener is required to at least in part focus on interacting with the radio receiver rather than on paying attention to the road. Therefore, both convenience and safety would be well served by automating the selection of desirable audio content with a radio receiver.

SUMMARY OF THE INVENTION

The invention addresses these and other problems associated with the prior art by providing an apparatus, program product, and method that automate the selection of audio broadcast signals based upon a user preference criterion, typically by receiving a first audio broadcast signal from a first source, and concurrently monitoring a second source to locate a second audio broadcast signal matching a user preference criterion. The user preference criterion may represent a particular type of song, program, artist, genre, etc., or in the alternative may represent one or more specific programs, songs, etc. Thus, by monitoring for sources that match the user preference criterion concurrently with receiving a signal from a first source, automation of the selection of matching audio broadcast signals (e.g., by notifying a user of a match, automatically selecting a matching audio broadcast signal, etc.) is greatly facilitated.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The discussion hereinafter will focus on a specific implementation of the invention in the field of digital radio broadcasting, where an audio broadcast signal is transmitted in the form of a digital data stream incorporating streamed data packets carrying audio information representative of an audio broadcast. It is assumed for the purposes of the illustrated embodiments that program information, e.g., in the form of program information packets, is embedded within the digital data stream. However, it will be appreciated by one of ordinary skill in the art having the benefit of the instant disclosure that certain aspects of the invention will have applicability in other applications where audio signals may be broadcasted, e.g., analog radio broadcasts, etc. Moreover, other manners of embedding program information within an audio broadcast signal may also be used in the alternative. Thus, the invention is not limited to the specific implementations discussed herein.

Figure 1:
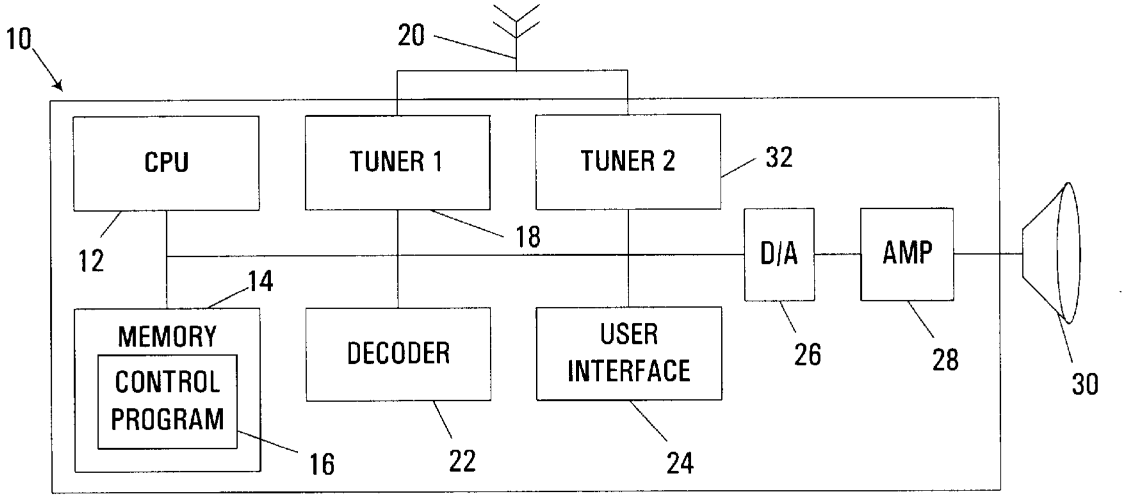
FIG. 1 is a block diagram of a digital radio receiver consistent with the invention.

Turning now to the Drawings, wherein like numbers denote like parts throughout the several views, FIG. 1 illustrates a specific implementation of the invention in a digital radio receiver 10, e.g., suitable for use in a mobile application (as with a car stereo) or a stationary application (as with a home stereo). Receiver 10 includes a central processing unit (CPU) 12 interfaced with a memory 14, within which resides a control program 16 that is executed by the CPU to implement the functionality described herein, as well as other functionality of a digital radio receiver as is known in the art. In this context, CPU 12, memory 14, and control program 16 function as a controller for the digital radio receiver. In other environments, however, hardwired logic may be used in lieu of a stored program and processor, and thus, the invention is not limited to the particular implementation described herein.

Receiver 10 may be implemented using practically any type of computer, computer system or other programmable electronic device. The CPU 12 thereof may include one or more processors (e.g., microprocessors or microcontrollers), and the memory may represent volatile or non-volatile solid state memories, magnetic storage media, optical storage media, or combinations of the same, as well as any supplemental levels of memory, e.g., cache memories, backup memories (e.g., programmable or flash memories), read-only memories, etc. In addition, the memory may be considered to include memory storage physically located elsewhere in a digital processing system, e.g., any cache memory in a processor, as well as any storage capacity used as a virtual memory, e.g., as stored on a mass storage device or on another device coupled over a network interconnection.

Receiver 10 typically operates under the control of an operating system, and executes various computer software applications, components, programs, objects, modules, etc. (e.g., control program 16, among others). Moreover, various applications, components, programs, objects, modules, etc. may also execute on one or more processors in another computer or other device coupled to such receiver via networked interconnections, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs". The computer programs typically comprise instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

Over-the-air digital packets are received by a primary tuner 18 coupled to an antenna 20, and are decoded by a decoder 22. Interaction with a user is supported via a user interface 24, which may include both a display panel for displaying information to a user as well as one or more buttons for receiving input from a user. Audio data packets decoded by decoder 22 are converted into an analog format by a digital-to-analog (D/A) converter 26, with the analog output of converter 26 fed to an amplifier 28 that drives one or more loudspeakers 30. It will be appreciated that the reception and decoding of digital data packets, the generation and emission of an audible signal based upon the information within such packets, and the interaction with a user are all well understood functions implemented by digital radio receivers.

An additional broadcast reception device, e.g., a secondary tuner 32, is utilized in receiver 10 to support the monitoring for alternate signal sources matching a user preference criterion while the user is listening to an audio broadcast signal received by tuner 18. Tuner 32 may share antenna 20 with tuner 18, or may utilize a separate antenna. Moreover, tuners 18 and 32 may be identically configured, or may differ from one another in terms of the bands received thereby (e.g., digital, AM, FM, etc.).

Figure 2:
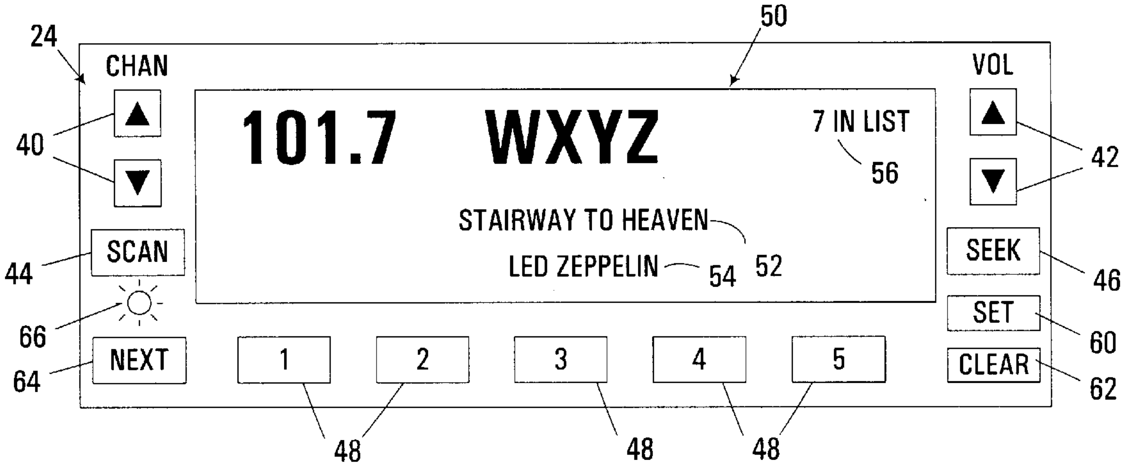
FIG. 2 illustrates an exemplary display panel for the digital radio receiver of FIG. 1.

FIG. 2 illustrates an exemplary user interface 24, e.g., as may be utilized in a mobile radio receiver for use in cars, trucks and other vehicles. User interface 24 is implemented specifically as a face plate control panel including a plurality of buttons 40–48 ad 60–64 for use in receiving user input and a display 50 capable of displaying information to a user. User interface 24 includes a number of conventional radio buttons, including tuning buttons 40, volume buttons 42, scan button 44, seek button 46 and channel select buttons 48, the use and configuration of which are well known in the art.

Display 50 may be implemented using any of a number of known display technologies, including, for example, LCD's, LED's, etc. Moreover, it will be appreciated that a wide variety of alternate user interfaces may be used in the alternative. For example, display 50 may incorporate a touch screen to permit direct user input to the display. In other applications, alternate computer or other electronic device interfaces may be used, including keyboards, pointing devices, video displays, etc., as appropriate for the particular type of application within which the receiver is being used. The invention is therefore not limited to the particular user interface disclosed herein.

Display 50 is typically configured to display program information to a user, e.g., a program or song title 52 and/or an artist 54, as appropriate for the particular program information embedded within the audio broadcast signal received by tuner 18. For example, FIG. 2 illustrates a representative song title and artist when a musical composition is, being received by receiver 10. In the alternative, if another type of program is being received, e.g., a sporting event, a news program, a talk show, etc., suitable identifying information may be displayed on display 50 as appropriate.

In addition to the aforementioned program information, display 50 may also display a song list count 56, representing the number of songs stored in a favorites list representing the user preference criterion in the illustrated embodiment. As will become more apparent below, a user is able to create a favorites list containing favorite programs, songs and/or artists through selection of a set button 60 when a particular program or song is being received by tuner 18. For example, if a user is currently listening to the song "Stairway to Heaven" by the artist Led Zeppelin, one or both of the song title and artist may be added to the favorites list in response to selection of set button 60.

A complementary clear button 62 is used to clear the favorites list and eliminate past user selections. In one embodiment, using the clear button followed by the set button enables a user to select a single program to attempt to locate another source for the same program, e.g., to find a particular sporting event. In other embodiments, however, monitoring for a particular program may be supported separately from a favorites list such that prior user preferences need not be discarded whenever it is desirable to locate the particular program.

It will also be appreciated that other manners of storing and maintaining user preference information used in selecting other sources may be used consistent with the invention. For example, information pertaining to disliked programs, songs and/or artists may be used in lieu of or in addition to liked programs, songs and artists. In addition, no artist information may be tracked. Other alternatives will become apparent to one of ordinary skill in the art having the benefit of the instant disclosure.

An additional function supported by receiver 10 is a "next" function, which is supported to permit a user to select an alternate source that has been found to (1) be currently playing a program that matches the user preference criterion and (2) have a stronger signal than the current signal being received by tuner 18. Activation of the next function is made via a next button 64, and the availability of the next function, i.e., in response to a determination that an alternate source matching the above criterion has been found, is indicated by a visual indicator 66.

Figure 3:
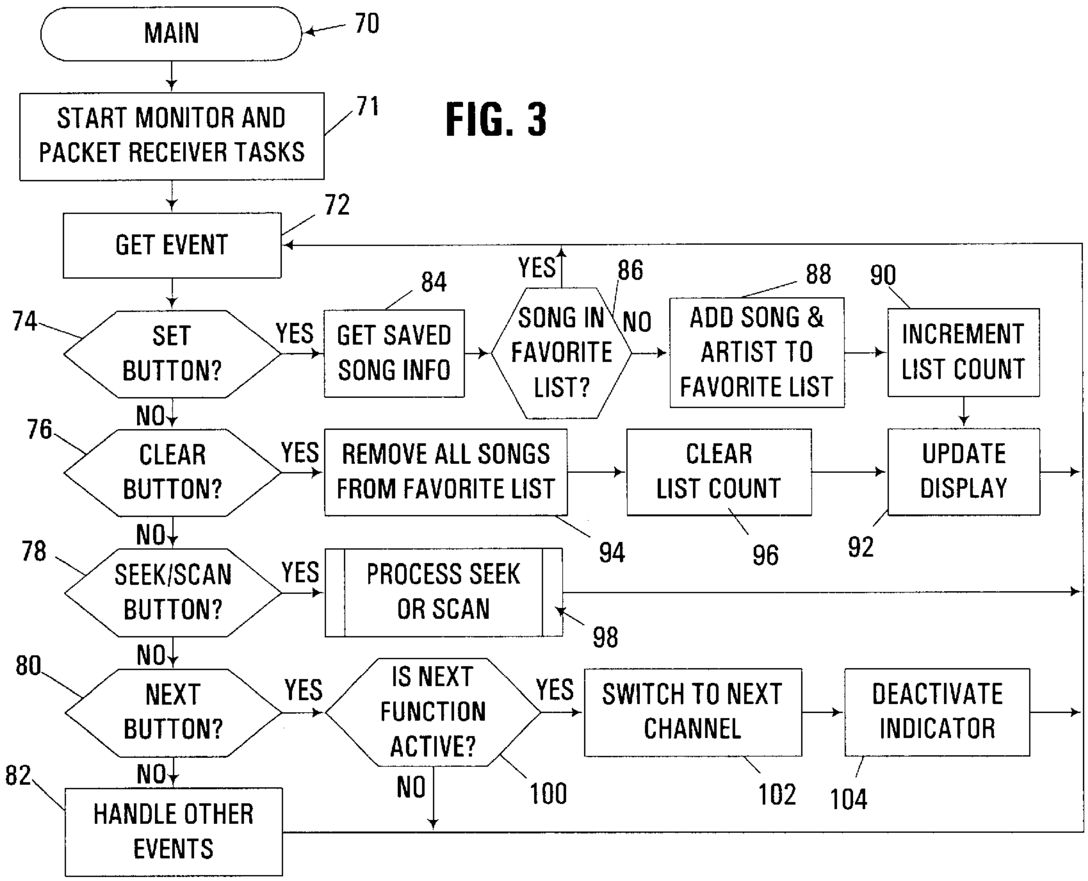
FIG. 3 is a flowchart illustrating the program flow of a main routine executed by the digital radio receiver of FIG. 1.

FIG. 3 illustrates a main routine 70 executed by control program 16 of FIG. 1. Routine 70 begins in block 71 by starting monitor and packet receiver tasks to perform various background functions for the receiver. In particular, the monitor task (described in connection with FIG. 5 below) monitors all available stations against the user preference criterion to determine the relevancy of such stations to the criterion. The packet receiver task (described in connection with FIGS. 6-8 below) primarily processes incoming packets from a digital radio broadcast data stream received by tuner 18 and decoded by decoder 22 (FIG. 1).

Returning to FIG. 3, control next passes to block 72 to initiate an event-driven loop to process events generated by the receiver. Received events are decoded by one of a plurality of blocks 74–82. Blocks 74–80 specifically decode events utilized in implementing the automated monitoring and selection of signal sources consistent with the invention. Additional events processed by the main program, the details of which are not relevant to an understanding of the invention, are handled in a conventional manner in block 82.

Block 74, for example, detects depression of the set button, and in response passes control to block 84 to retrieve the saved song information, i.e., the program information for the current program being received by tuner 18. Block 86 determines whether the song (or program) being listened to is already in the favorite list for the user. If so, control returns to block 72. If not, however, control passes to block 88 to add both the song and the artist to the favorite list. Block 90 then increments the list count, representing the number of songs in the list. Control then passes to block 92 to update the display to reflect the new list count (e.g., as shown in FIG. 2). Handling of the event is then complete.

Block 76 detects depression of the clear button, and in response passes control to block 94 to remove all songs from the favorite list. Block 96 then clears (nulls) the list count. Control then passes to block 92 to update the display to reflect the zero list count, and handling of the event is complete.

Block 78 detects depression of the seek or scan button, and in response calls a process seek or scan routine 98, prior to returning control to block 72. Routine 98 is discussed in greater detail below in connection with FIG. 4.

Block 80 detects depression of the next button, and in response passes control to block 100 to determine whether the next function is active—that is, whether another source has been detected having a stronger signal and a current content that matches the user preference criterion (activation of the next function is discussed below in connection with FIG. 8). If the function is not active, the button is disregarded, and control returns to block 72. Otherwise, control passes to block 102 to switch to the "next" channel, and then to block 104 to deactivate the visual indicator 66 (FIG. 2). Control then returns to block 72.

Figure 4:
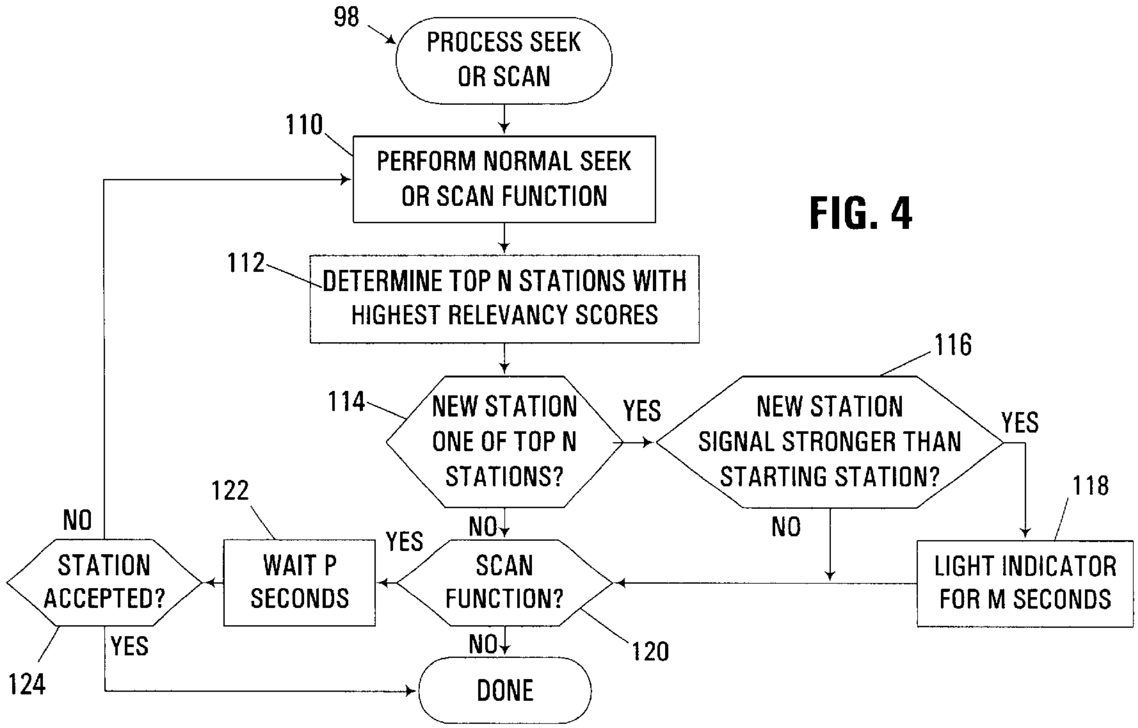
FIG. 4 is a flowchart illustrating the program flow of the process seek or scan routine referenced in FIG. 3.

FIG. 4 illustrates process seek or scan routine 98 in greater detail. Routine 98 begins in block 110 by performing a conventional seek or scan function—that is, to scan forward or backward through the current radio band to locate a station having a signal strength exceeding a minimum threshold. Control then passes to block 112 to determine the top N stations from a station list with the highest relevancy scores with respect to the current user selection criterion. As will be discussed in greater detail below, the aforementioned monitor task builds the station list that identifies all available stations, along with associated relevancy scores that indicate the relative degree to which each such stations matches the user preference criterion. As such, block 112 merely selects a subset of the station list ordered by relative relevancy.

Block 114 next determines whether the new station reached via the seek or scan function is in the subset of relevant stations. If so, control passes to block 116 to determine whether the signal strength of the new station is stronger than the station being received when the seek or scan function was activated. If so, control passes to block 118 to light the visual indicator for M seconds to indicate to the user that the new station is relevant based on the user preference criterion.

Control then passes to block 120 to determine whether the seek or scan button was depressed. If the seek button was depressed, routine 98 is complete, and the new station is selected. Otherwise, if the scan button was depressed, control passes to block 122 to wait P seconds to enable the user to listen to the new station, as well as to permit the user to reselect the scan button to indicate acceptance of the new station. As such, after the delay, control passes to block 124 to determine whether the user accepted the new station. If so, routine 98 is complete, and the new station is selected. Otherwise control returns to block 110 to scan to the next station having a signal strength exceeding the minimum threshold. In addition, returning to blocks 114 and 116, if either the new station is not in the top N stations, or the new station signal strength does not exceed that of the starting station, block 118 is bypassed, and control proceeds directly to block 120.

Figure 5:
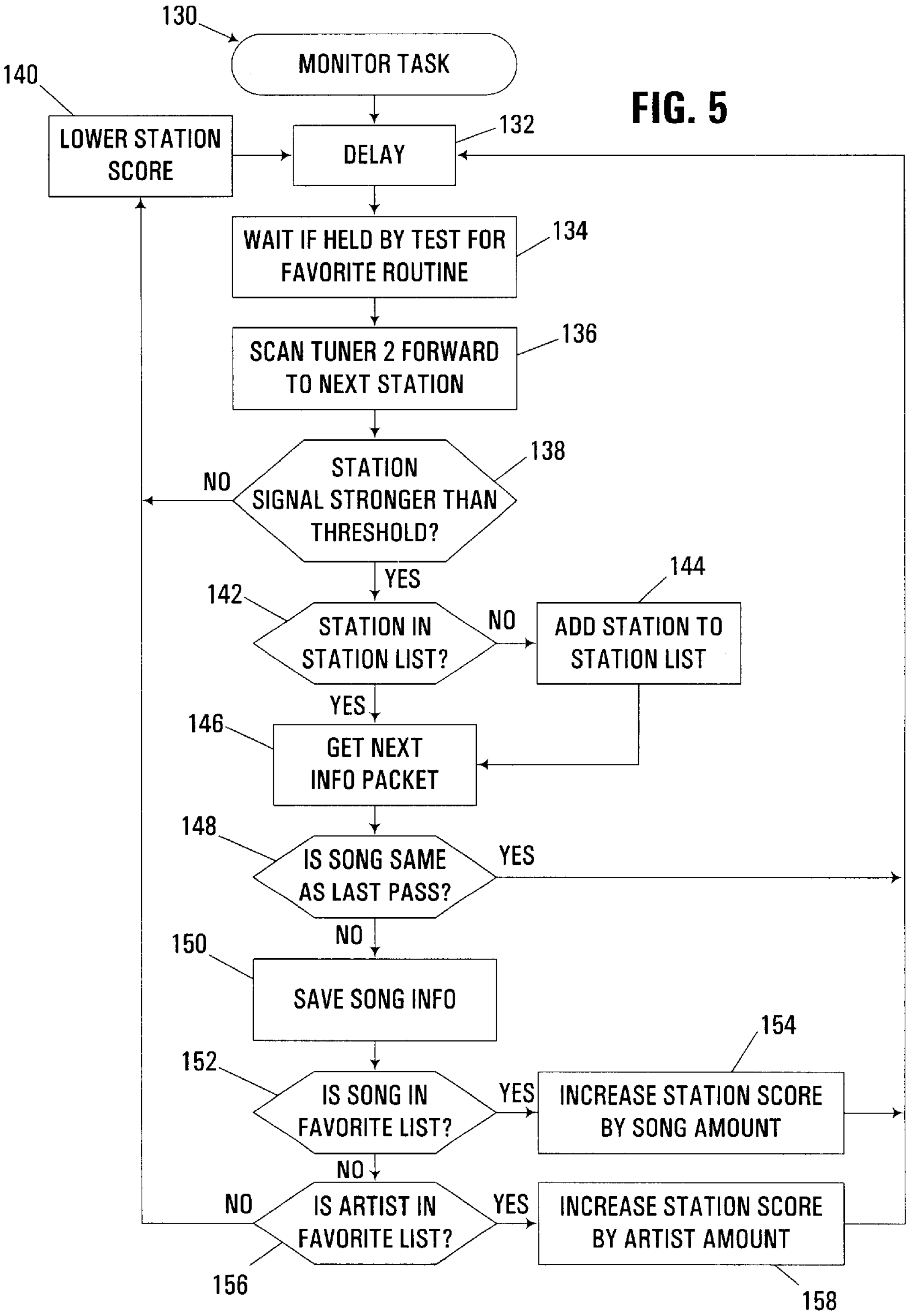
FIG. 5 is a flowchart illustrating the program flow of the monitor task referenced in FIG. 3.

FIG. 5 illustrates a monitor task 130 in greater detail. Monitor task 130 is configured to periodically monitor all available stations to determine the relevancy of each station to the current user preference criterion. The task utilizes a list of available stations, each having a score associated therewith for representing the relevancy of the station to the current user preference criterion.

The monitor task begins in block 132 by waiting for a short delay. Next, block 134 determines whether the task is being held by a test for favorite routine (discussed below in connection with FIG. 8). Holding the task permits the test for favorite routine to control the secondary tuner 32, as will become more apparent below.

Once the task is released, control passes to block 136 to scan tuner 32 forward to the next available station. Typically, doing so incorporates scanning forward through the available frequencies to locate a next station having a signal strength that exceeds a minimum threshold, much like a seek or scan function.

Next, block 138 determines whether the station signal strength exceeds another, higher threshold used to determine whether the station is suitable for tracking as a potential favorite station. If not, a score for the station is lowered by passing control to block 140. In addition, if the station score falls below a threshold, it may be desirable to remove the station from the list altogether.

If the signal strength exceeds the threshold, control passes to block 142 to determine whether the station is in the station list. If not, control passes to block 144 to add the station to the station list. After the station has been added, or if the station was already in the list, control passes to block 146 to obtain the next information packet from the digital data stream received by tuner 32, containing the current program information for the station.

Block 148 next determines whether the current song (program) is the same as the last time the station was monitored. If so, control returns to block 132, and monitoring of the current station is complete. If not, however, the current program information is saved for the station in block 150. Next, block 152 determines whether the song (program) identified in the program information matches a song or program title in the favorite list. If so, control passes to block 154 to increase the station score by a song amount, thereby increasing the relevancy of the station. Control then returns to block 132.

If the song is not in the favorite list, control passes to block 156 to determine if the artist identified in the program information is in the favorite list. If so, control passes to block 158 to increase the station score by an artist amount to increase the relevancy of the station on the list. Otherwise, control passes to block 140 to decrease the station score. It will therefore be seen that the monitor task is able to increase or decrease the score, or relevancy, of each station based upon both signal strength and relevancy to the user preference criterion. It will be appreciated that the relative values of the song amount, the artist amount and the amount that the station score is decreased in block 140 may be set to customize the response of the control program in determining the relative relevancy of the available stations.

Figure 6:
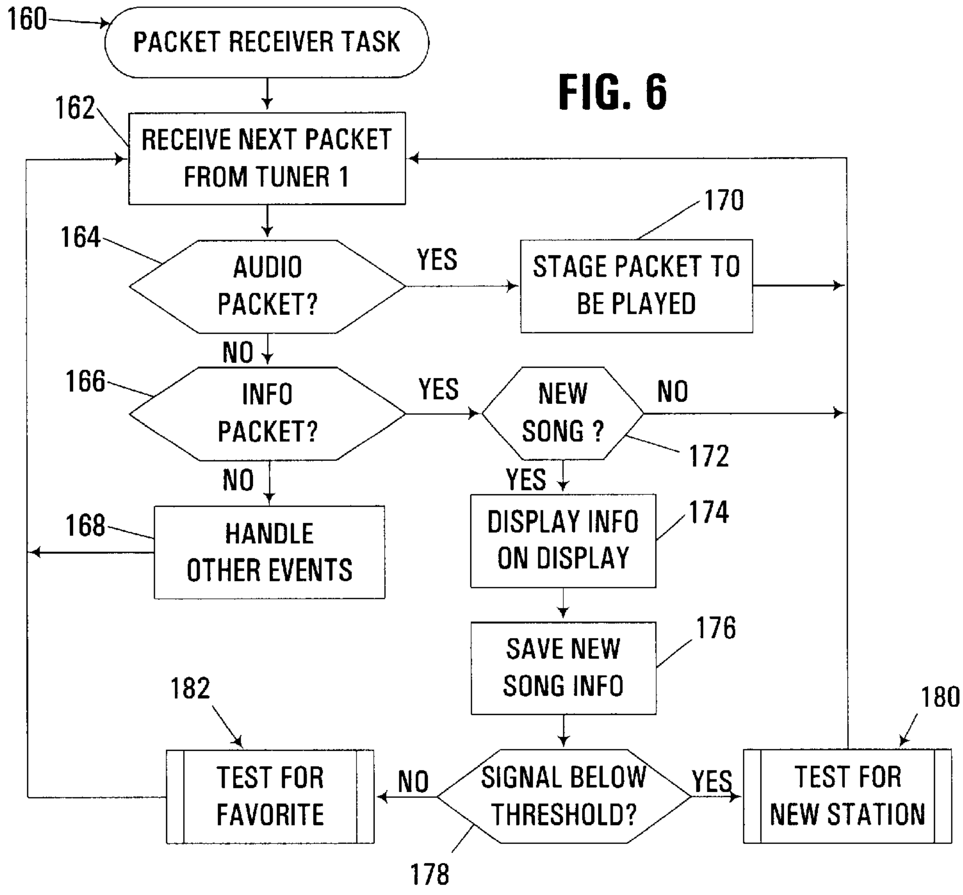
FIG. 6 is a flowchart illustrating the program flow of the packet receiver task referenced in FIG. 3.

FIG. 6 next illustrates a packet receiver task 160 in greater detail, which is principally utilized in handling the decoding and processing of packets received by decoder 22 from tuner 18. Task 160 begins in block 162 by receiving a next packet from tuner 18. Next, blocks 164–168 detect and decode different packet types. Block 164, for example, detects audio packets, which represent the audio information that is converted to analog format and played back over speakers 30. For each such packet, block 164 passes control to block 170 to stage the packet to be played back over the speakers, in a manner well known in the art.

Block 166 detects information packets, which are used to transmit program information, including, for example, station identification information, program or song title information, artist information, timing information, etc. Other types of packets may also be received; however, the details of such packets are not relevant to an understanding of the invention. Detection and handling of such packets in a conventional manner are therefore represented by block 168.

Returning to block 166, for each information packet, control passes to block 172 to determine whether a new song or program is being received. Typically, this is implemented by comparing the program information in the packet with saved song information for the current station. If the song has not changed, the packet is disregarded and control returns to block 162. Otherwise; control passes to block 174 to display the new program information on the display.

Next, block 176 saves the new song (program) information for the current station, and control passes to block 178 to determine whether the current signal strength has fallen below a threshold. If so, a test for new station routine 180 is called by task 160. If not, a test for favorite routine 182 is called by task 160. Upon completion of either routine, control returns to block 162 to continue the processing of received packets.

Figure 7:
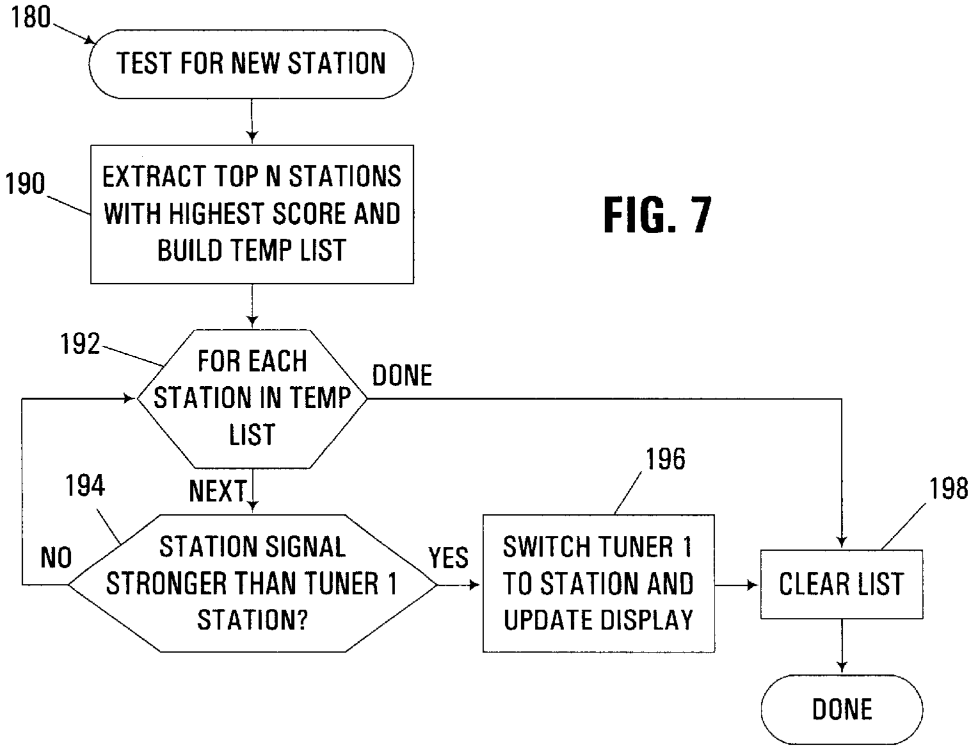
FIG. 7 is a flowchart illustrating the program flow of the test for new station routine referenced in FIG. 6.

FIG. 7 illustrates test for new station routine 180 in greater detail. Typically, routine 180 is called whenever the signal strength of the current station has fallen to a point that it is desirable to find another station that matches a user's preferences. As such, often the threshold used in block 178 of FIG. 6 is chosen based upon the likelihood that the current station is about to be, or has already been, lost.

Routine 180 begins in block 190 by extracting the top N stations from the station list having the highest relevancy scores, and placing the top N stations in a temporary list. In addition, the stations in the temporary list are typically sorted by relevancy score, with the highest score at the top of the list. Next, block 192 initiates a FOR loop to process each station in the temporary list. For each such station, control passes to block 194 to compare the signal strength of the station with the station currently being received by tuner 18. The signal strength of the station from the temporary list may be determined, for example, by storing a signal strength during monitoring, switching tuner 18 to the station to determine a signal strength, or tuning tuner 32 to the station to determine a signal strength (which may require holding the monitor task).

If the signal strength is not greater than the current station, control returns to block 192 to process the next station in the temporary list. If the signal strength is greater, however, control passes to block 196 to switch tuner 18 to the new station and update the display information accordingly. Control then passes to block 198 to clear the temporary list, whereby routine 180 is complete. Returning to block 192, if all stations in the temporary list are found to have signal strengths below the current station, control passes to block 198 to clear the list and terminate the routine without selecting a new station.

Figure 8:
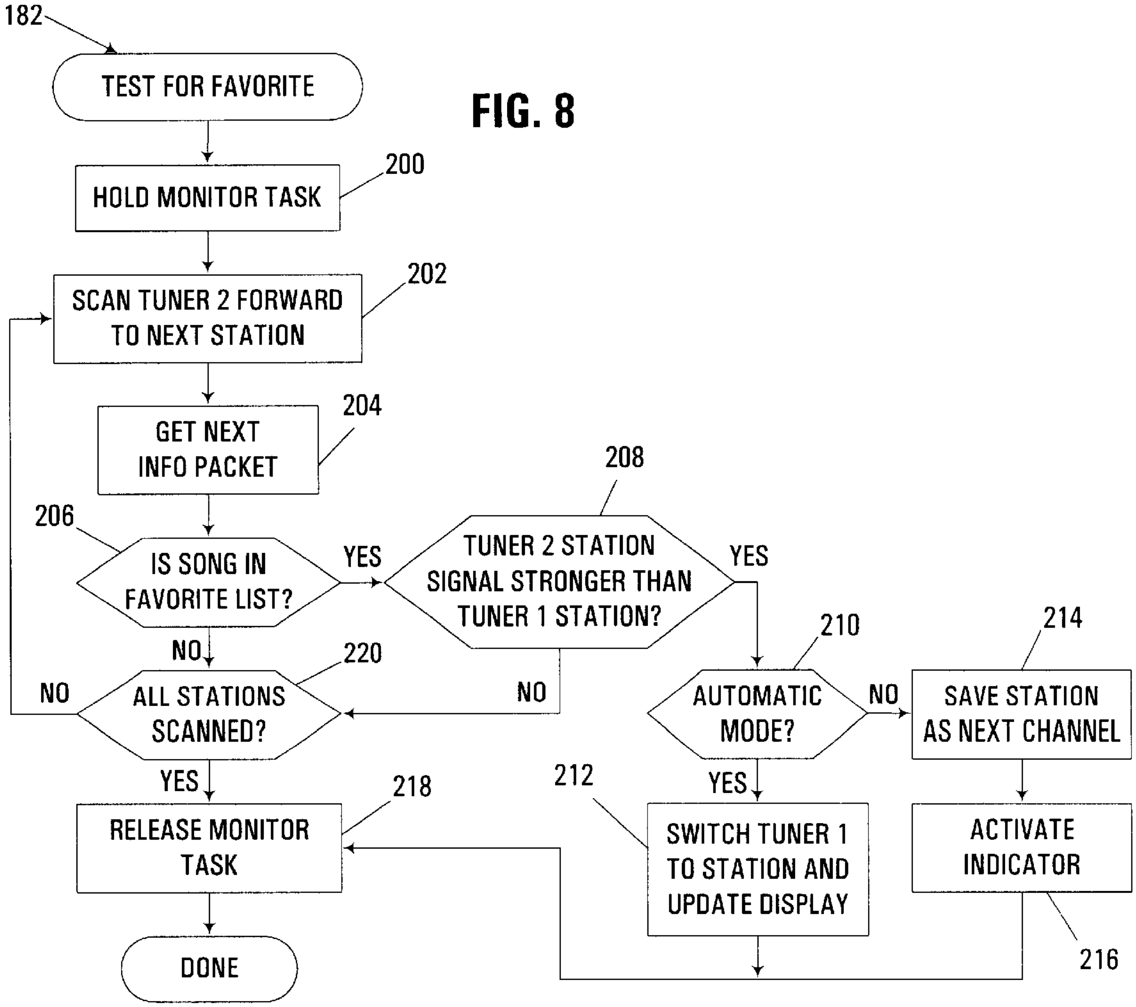
FIG. 8 is a flowchart illustrating the program flow of the test for favorite routine referenced in FIG. 6.

FIG. 8 illustrates test for favorite routine 182 in greater detail. Routine 182 is used to either automatically or semi-automatically select an alternate station whenever the current station signal exceeds the threshold in block 178 of FIG. 6.

Routine 182 begins in block 200 by placing a hold on the monitor task, thereby freeing secondary tuner 32 for use by routine 182. Next, block 202 scans tuner 32 forward to the next available station. Block 204 then retrieves the next information packet from the next station, and block 206 determines whether the song or program identified in the information packet is in the favorite list.

If so, control passes to block 208 to determine whether the signal strength of the next station received by tuner 32 exceeds that of the current station received by tuner 18. If so, control passes to block 210 to select one of an automatic or a semiautomatic mode, typically based on user configuration of the receiver.

If an automatic mode is selected, control passes to block 212 to switch tuner 18 to the next station and update the display accordingly. Otherwise, if the semiautomatic mode is selected, control passes to block 214 to save the station as the "next" channel, and then to block 216 to activate the visual indicator. As such, in the semi-automatic mode the user is informed that another station is available for listening. Depression of the "next" button (discussed above in connection with FIG. 3) will therefore initiate selection of the "next channel" station as the current station being received by tuner 18.

Upon completion of either of block 212 or block 216, control passes to block 218 to release the monitor task and terminate routine 182. In addition, returning to blocks 206 and 208, if either the current song is not on the favorite list, or the signal strength on tuner 32 does not exceed that of tuner 18, control passes to block 220 to determine whether all stations have been scanned. If not, control returns to block 202 to scan forward to the next station. Otherwise, control passes to block 218 to release the monitor task and terminate the routine.

Various modifications may be made to the illustrated embodiments without departing from the spirit and scope of the invention. For example, various alternate data structures and selection criterion may be utilized to represent a user preference criterion consistent with the invention. Different relative relevancy weights may be assigned based on program, song, or artist, and furthermore, additional factors, e.g., an identified genre associated with a station (e.g., classic rock, country, talk radio, news, sports) may also be used in connection with song, artist and/or program information to determine a relevancy for a particular station.

In addition, other manners of selecting favorite songs, programs or artists may be used to generate a user preference criterion. For example, a database of favorite songs or artists may be searched by a user, with appropriate favorites selected by a user in lieu of or in addition to depression of a set button as described herein.

Furthermore, other manners of automating the selection of alternate stations may be used, whether or not based on the signal strength of the current station. For example, a user may be notified whenever another station is currently playing a song or program on the favorite list despite the signal strength of the current station. The user may then be prompted to select the new station, and may be informed of the title of the song and/or the identity of the new station to assist the user in deciding whether to select the new station. If multiple stations are playing songs from a favorite list, the user may even be presented with a list of such stations and/or songs (e.g., via a scrollable menu on the display).

Other modifications will be apparent to one of ordinary skill in the art. Therefore, the invention lies in the claims hereinafter appended.

What is claimed:

1. A method of receiving audio broadcasts, the method comprising:

(a) receiving a first audio broadcast signal from a first source;

(b) monitoring a second source concurrently with receiving the audio broadcast signal from the first source to locate a second audio broadcast signal matching a user preference criterion, wherein monitoring the second source includes receiving program information in the second audio broadcast signal; and (c) comparing the program information with the user preference criterion, wherein the program identification identifies a program title, and wherein the user preference criterion identifies at least one favorite program, wherein comparing the program information with the user preference criterion includes comparing the program title from the second audio broadcast signal with the favorite program identified by the user preference criterion.

2. The method of claim 1, wherein receiving the first audio broadcast signal is performed with a first tuner, and monitoring the second source is performed with a second tuner.

3. The method of claim 2, wherein the first and second tuners are configured to receive digital radio signals.

4. The method of claim 1, wherein monitoring the second source includes scanning through a plurality of sources to locate audio broadcast signals that match the user preference criterion.

5. The method of claim 1, further comprising notifying a user that the second audio broadcast signal matches the user preference criterion.

6. The method of claim 1, further comprising selecting the second audio broadcast signal to be received in lieu of the first audio broadcast signal responsive to the second audio broadcast signal matching the user preference criterion.

7. The method of claim 1, wherein selecting the second audio broadcast signal is further responsive to a signal strength of the second audio broadcast signal exceeding that of the first audio broadcast signal.

8. A method of receiving audio broadcasts, the method comprising:

(a) receiving a first audio broadcast signal from a first source:

(b) monitoring a second source concurrently with receiving the audio broadcast signal from the first source to locate a second audio broadcast signal matching a user preference criterion, wherein monitoring the second source includes receiving program information in the second audio broadcast signal; and (c) comparing the program information with the user preference criterion, wherein the program information identifies a song title, and wherein the user preference criterion identifies at least one favorite song, wherein comparing the program information with the user preference criterion includes comparing the song title from the second audio broadcast signal with the favorite song identified by the user preference criterion.

9. The method of claim 8, wherein the program information further identifies an artist, and wherein the user preference criterion identifies at least one favorite artist, wherein comparing the program information with the user preference criterion further includes comparing the artist from the second audio broadcast signal with the favorite artist identified by the user preference criterion.

10. The method of claim 9, wherein the user preference criterion identifies a plurality of favorite songs and a plurality of favorite artists.

11. The method of claim 10, further comprising adding at least one of a song and an artist identified by program information in the first audio broadcast signal to the user preference criterion in response to user input received during reception of the first audio broadcast signal.

12. A method of receiving audio broadcasts, the method comprising:

(a) receiving a first audio broadcast signal from a first source;

(b) monitoring a second source concurrently with receiving the audio broadcast signal from the first source to locate a second audio broadcast signal matching a user preference criterion, wherein monitoring the second source includes scanning through a plurality of sources to locate audio broadcast signals that match the user preference criterion; and (c) calculating a relevancy score for at least a subset of sources from the plurality of sources based upon the relevancy of each source in the subset of sources to the user preference criterion.

13. The method of claim 12, further comprising:

(a) detecting a signal strength for the first audio broadcast signal being below a threshold; and (b) in response thereto, using the relevancy scores of the subset of sources to select an alternate source from which to receive an alternate audio broadcast signal in lieu of the first audio broadcast signal.

14. A method of receiving audio broadcasts, the method comprising:

(a) receiving a first audio broadcast signal from a first source, including receiving program information in the first audio broadcast signal that identifies a current program;

(b) monitoring program information from a plurality of sources concurrently with receiving the audio broadcast signal from the first source to locate an alternate source for the current program;

(c) indicating that an alternate source for the current program is available with a stronger signal than the first source; and (d) switching from the first source to the alternate source with the stronger signal in response to user input.

15. The method of claim 14, wherein receiving the first audio broadcast signal is performed with a first digital radio tuner, and wherein monitoring program information from a plurality of sources is performed with a second digital radio tuner.

16. The method of claim 15, wherein switching from the first source to the alternate source comprises returning the first digital radio tuner to receive a second audio broadcast signal from the alternate source for the current program.

17. A method of receiving audio broadcasts, the method comprising:

(a) receiving user input defining a user preference criterion that identifies user preferences for audio broadcast programming;

(b) monitoring program information from a plurality of sources to locate at least one source matching the user preference criterion wherein the user preference criterion identifies at least one of a favorite program, a favorite song and a favorite artist, and wherein monitoring the program information includes comparing the program information with the user preference criterion by comparing at least one of the program title, the song title and the artist from the second audio broadcast signal with at least one of the favorite program, the favorite song and the favorite artist identified by the user preference criterion; and (c) indicating during reception of an audio broadcast signal from a first source whether the first source matches the user preference criterion.

18. An apparatus, comprising:

(a) a tuner configured to receive a first audio broadcast signal from a first source; and (b) a program configured to monitor a second source concurrently with reception of the audio broadcast signal from the first source to locate a second audio broadcast signal matching a user preference criterion, wherein the program is configured to monitor the second source by receiving program information in the second audio broadcast signal, and to compare the program information with the user preference criterion;

wherein the program identification identifies at least one of a program title, a song title and an artist, and wherein the user preference criterion identifies at least one of a favorite program, a favorite song and a favorite artist, and wherein the program is configured to compare the program information with the user preference criterion by comparing at least one of the program title, the song title and the artist from the second audio broadcast signal with at least one of the favorite program, the favorite song and the favorite artist identified by the user preference criterion.

19. The apparatus of claim 18, further comprising a second tuner, wherein the program is configured to monitor the second source using the second tuner.

20. The apparatus of claim 18, wherein the program is configured to monitor the second source by scanning through a plurality of sources to locate audio broadcast signals that match the user preference criterion.

21. The apparatus of claim 18, wherein the program is further configured to add at least one of a song and an artist identified by program information in the, first audio broadcast signal to the user preference criterion in response to user input received during reception of the first audio broadcast signal.

22. The apparatus of claim 18, wherein the program is further configured to calculate a relevancy score for at least a subset of sources from the plurality of sources based upon the relevancy of each source in the subset of sources to the user preference criterion, detect a signal strength for the first audio broadcast signal being below a threshold; and, in response thereto, to use the relevancy scores of the subset of sources to tune the tuner to receive an alternate audio broadcast signal in lieu of the first audio broadcast signal.

23. The apparatus of claim 18, wherein the program is further configured to notify a user that the second audio broadcast signal matches the user preference criterion.

24. The apparatus of claim 18, wherein the program is further configured to tune the tuner to receive the second audio broadcast signal in lieu of the first audio broadcast signal responsive to the second audio broadcast signal matching the user preference criterion.

25. The apparatus of claim 18, wherein the program is further configured to tune the tuner to receive the second audio broadcast signal further responsive to a signal strength of the second audio broadcast signal exceeding that of the first audio broadcast signal.

26. An apparatus, comprising:

(a) a tuner configured to receive a first audio broadcast signal from a first source, the first audio broadcast signal including program information that identifies a current program;

(b) a program configured to monitor program information from a plurality of sources concurrently with reception of the audio broadcast signal from the first source to locate an alternate source for the current program, to indicate that an alternate source for the current program is available with a stronger signal than the first source, and to switch from the first source to the alternate source with the stronger signal in response to user input.

27. An apparatus, comprising:

(a) a tuner configured to receive a first audio broadcast signal from a first source; and (b) a program configured to receive user input defining a user preference criterion that identifies user preferences for audio broadcast programming, to monitor program information from a plurality of sources to locate at least one source matching the user preference criterion, and to indicate during reception of the first audio broadcast signal from the first source whether the first source matches the user preference criterion, wherein the user preference criterion identifies at least one of a favorite program a favorite song and a favorite artist, and wherein the program is configured to compare the program information with the user preference criterion by comparing at least one of the program title, the song title and the artist from the second audio broadcast signal with, at least one of the favorite program, the favorite song and the favorite artist identified by the user preference criterion.

28. A program product, comprising:

(a) a program configured to receive a first audio broadcast signal from a first source, and to monitor a second source concurrently with reception of the audio broadcast signal from the first source to locate a second audio broadcast signal matching a user preference criterion wherein the program is configured to monitor the second source by receiving program information in the second audio broadcast signal and to compare the progarm information with the user preference criterion, wherein the program identification identifies at least one of a program title, a song title and an artist, and wherein the user preference criterion identifies at least one of a favorite program, a favorite song and a favorite artist, and wherein the program is configured to compare the program information with the user preference criterion by comparing at least one of the program title, the song title and the artist from the second audio broadcast signal with at least one of the favorite program, the favorite song and the favorite artist identified by the user preference criterion; and (b) a signal bearing medium bearing the program.

29. The program product of claim 28, wherein the signal bearing medium includes at least one of a recordable medium and a transmission medium.

* * * * *